United States Patent [19]

Burgess

[11] 3,937,357
[45] Feb. 10, 1976

[54] PRESSURE-VACUUM RELIEF FUEL FILLER CAP

[75] Inventor: Ronald R. Burgess, Corunna, Mich.

[73] Assignee: Tom McGuane Industries, Inc., Farmington, Mich.

[22] Filed: Sept. 20, 1973

[21] Appl. No.: 399,120

[52] U.S. Cl. ............... 220/203; 220/288; 220/303
[51] Int. Cl.² .................... B65D 51/16; B65D 41/18
[58] Field of Search........... 220/44 R, 39 R, 24 GT, 220/24 C, 202, 203, 209, 288, 303, 304; 137/493.1, 493.3, 493.6, 493

[56] References Cited
UNITED STATES PATENTS
3,724,707  4/1973  Burgess ........................ 220/203

OTHER PUBLICATIONS
*Primary Examiner*—William T. Dixon, Jr.
*Assistant Examiner*—Allan N. Shoap
*Attorney, Agent, or Firm*—Barnes, Kisselle, Raisch & Choate

[57] ABSTRACT

A pressure-vacuum relief fuel filler cap comprising a cover, having a base and a peripheral flange, and a sub-assembly mounted at least partially within the cover with said peripheral flange surrounding a portion of the sub-assembly. The assembly comprises a body of synthetic plastic material including an outer threaded end adapted to engage a threaded filler opening, and an enlarged upper end with portions thereof engaging the base of the cover. A pressure relief valve and associated valve seat are mounted within the body and a vacuum relief valve and associated valve seat are mounted within the body. Torque limiting means are provided between the body and the cover for limiting the torque applied to the body during application to a filler opening, so that when a predetermined torque is reached, the cover can be rotated relative to the body and when the cap is rotated in the opposite direction, there can be no relative movement between the cover and the body.

43 Claims, 8 Drawing Figures

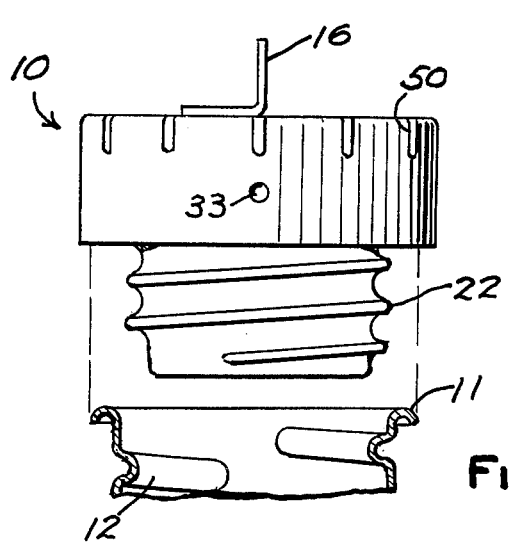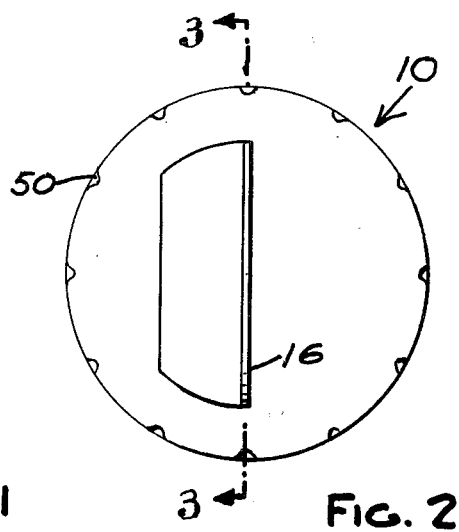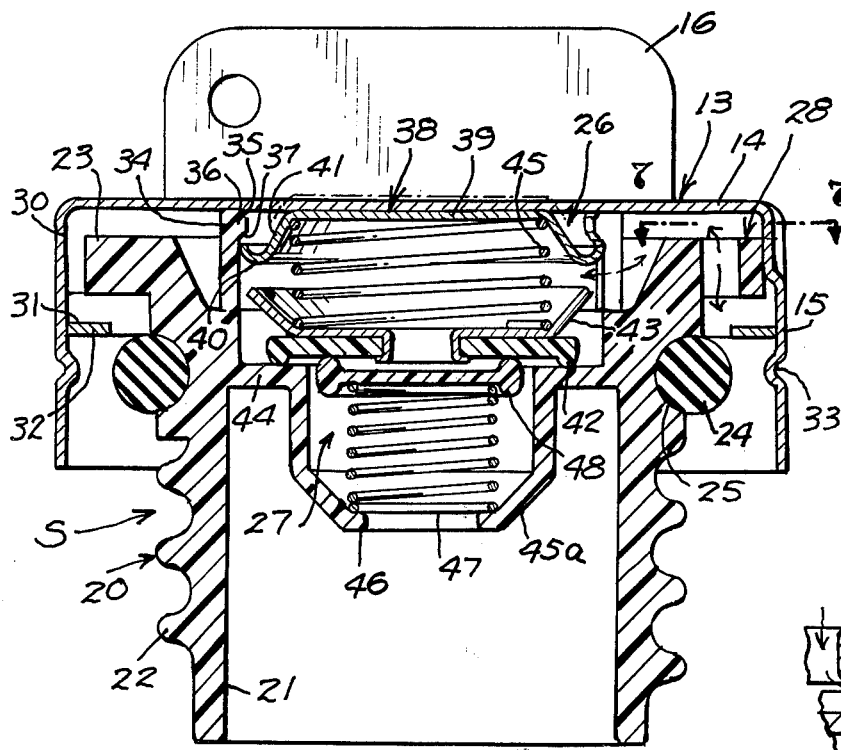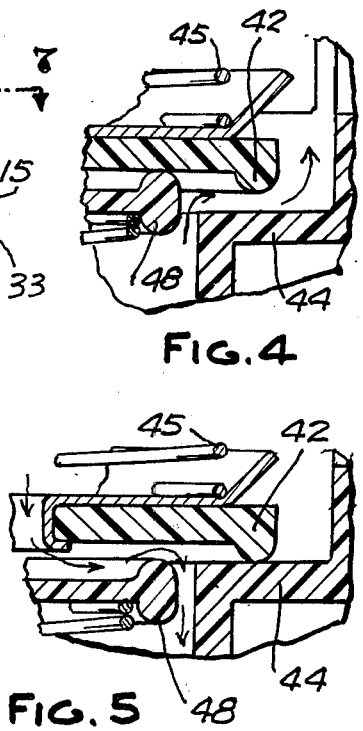

PRESSURE-VACUUM RELIEF FUEL FILLER CAP

This invention relates to fuel filler caps and particularly to pressure-vacuum relief fuel filler caps.

BACKGROUND OF THE INVENTION

"Evaporative loss control" or "evaporative emission control" are terms in general use to define a control, or method of controlling, hydrocarbons emissions to the atmosphere caused by evaporation of fuel. Included in this definition are those losses of evaporative nature from carburetor fuel bowl venting systems and from fuel tank venting systems.

When a hot engine is shut down, for instance, the residual heat in the engine can raise fuel bowl temperatures in some cases above 200°F. It is not unusual that under certain climatic, and geographic conditions that the fuel bowl will boil completely dry, emitting the associated evaporated hydrocarbons to the atmosphere.

Fuel tank evaporative losses can occur in much the same manner although the associated temperatures involved are somewhat reduced. If a fuel tank is filled with relatively cool fuel from underground storage tanks and then left to stand under high ambient temperature conditions, an actual loss of liquid fuel can occurr, as well as evaporative loss. These losses occur through either vented fuel tanks or vented fuel filler caps; whichever are employed for the purpose of preventing fuel tank rupture and or pressure differentials which may affect fuel pump operation.

The losses so described have been estimated to be 10–15 percent of the total hydrocarbon discharge to the atmosphere associated with internal combustion engines. Some jurisdictions have legislated control of these losses.

There are in general two control systems being utilized by the industry. The first system is generally called a vapor-recovery system wherein the vapors are directed to the crankcase and utilizes a pressure vacuum relief fuel filler cap as a means of protecting the fuel tank from structural damage due to excessive pressurre differentials caused during severe operation or by system malfunction. The system is considered to be fail safe as the fuel filler cap design eliminates the possibility of damage to the system which may be hazardous.

The second system is generally called an adsorption-generation system, and is similar to the first system except that a charcoal canister is utilized to entrap vapors for later burning. This system also utilizes a pressure vacuum relief fuel filler cap.

In my prior U.S. Pat. Nos. 3,724,707 and 3,724,708 there are disclosed and claimed vacuum relief fuel filler caps suitable for use on vehicles equipped for "evaporative loss control" or "evaporative emission control."

Since that time, federal regulations have been enacted which call for increased integrity of the entire fuel system (of which the filler cap is part) after a vehicle has been subjected to a variety of crash and rollover tests. The filler caps described in U.S. Pat. Nos. 3,724,707 and 3,724,708 utilize a brass diaphragm or washer which temporarily deforms when the cap is applied to the filler neck to provide a sealed surface at the interface of the filler cap and filler neck. If this type of filler cap is impacted sharply, as could be expected during rear or side impact collisions, the brass diaphragm is usually deformed beyond its elastic limit; at which time the seal at the interface of the filler neck and filler cap is destroyed. This condition could allow the escape of liquid fuel and increase the possibility of fire following a crash exposing the occupants of a crashed vehicle to a second source of possible serious injury.

It is also desirable to provide means to prevent the cap from being applied with excessive force such that it is difficult to remove.

Among the objects of this invention are to provide a fuel filler cap which will allow for an increase in integrity of the fuel filler cap, at the interface with its associated filler neck, during vehicle crashes while retaining the features of "evaporative loss control" as described in the aforementioned patents; and to provide a fuel filler cap embodying a torque limiting feature.

DESCRIPTION OF THE DRAWINGS

FIG. 1 is a part sectional exploded view of a fuel filler cap embodying the invention and a filler opening to which it is to be applied.

FIG. 2 is a plan view of the filler cap.

FIG. 3 is a sectional on an enlarged scale taken along the line 3—3 in FIG. 2.

FIGS. 4 and 5 are fragmentary sectional views of portions of FIG. 3 showing the parts of the filler cap in different operative positions.

DESCRIPTION

Figure 6:
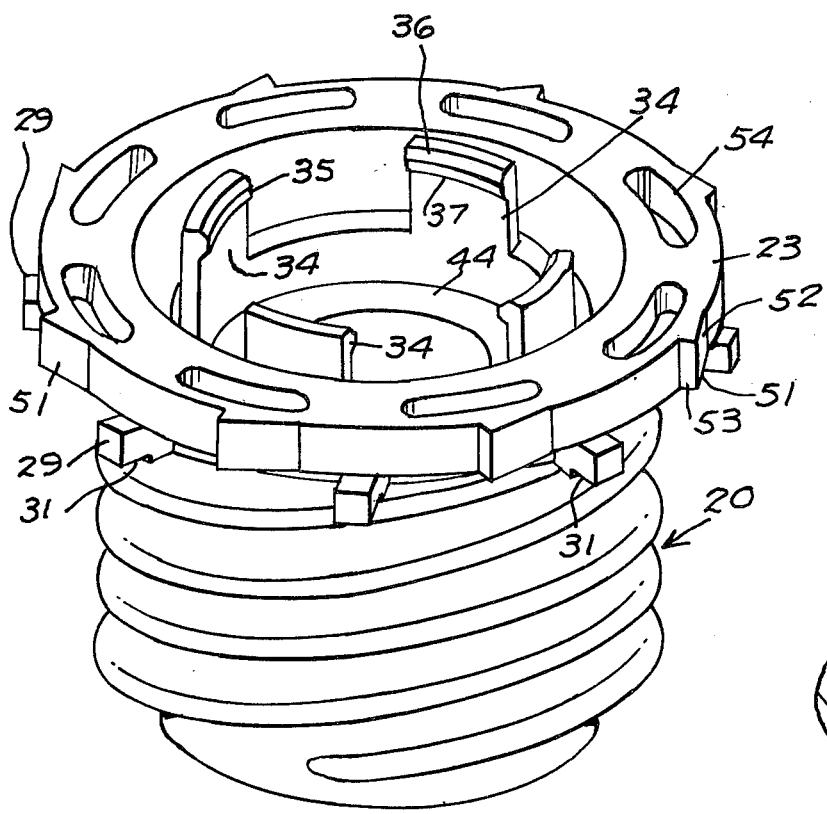
FIG. 6 is a perspective view of a portion of the filler cap.
Figure 7:
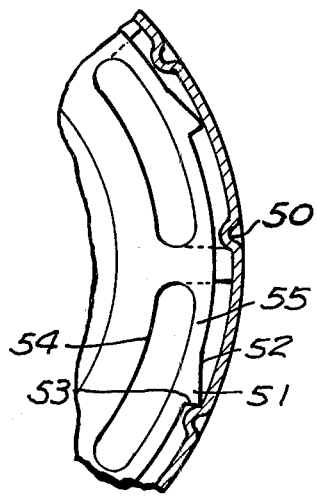
FIG. 7 is a fragmentary sectional view taken along the lines 7—7 in FIG. 3.

Referring to FIG. 1, the fuel filler cap 10 embodying the invention is adapted to be applied to a filler opening 11 that has an internal thread 12 herein shown as having a circumferential extent of slightly less than 360°.

The fuel filler cap 10 comprises a cover 13 including a flat base 14 and a peripheral flange 15. The cover 13 is provided with a handle 16 welded thereto and having a portion extending axially thereof to facilitate tightening and loosening on the filler opening.

The cap 10 further comprises a sub-assembly S which is assembled prior to placement in the cover 13 and is held within the cover 13 without welding, as presently described.

The sub-assembly S includes a body 20 which is made of a synthetic plastic material such as acetal resin which has a high strength and is resistant to gasoline. Body 20 includes a cylindrical portion 21 having an external thread 22 on the lower end thereof and an integral flange 23 extending radially outwardly on the upper end thereof. An O-ring 24 is seated in an arcuate seat 25 adjacent flange 23 and is adapted to engage the upper end of the filler opening.

A pressure relief valve generally designated 26 and a vacuum relief valve generally designated 27 are provided on the body 20. In addition, torque limiting means 28 are provided between the body 20 and the cover 13 to limit the torque with which the cap can be applied to the filler opening, as presently described.

Figure 8:
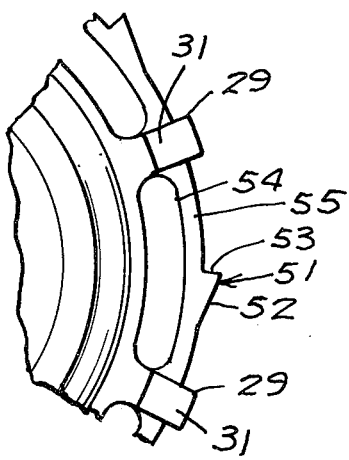
FIG. 8 is a fragmentary bottom view of a portion of the body shown in FIG. 6.

As shown in FIG. 8, the body 20 further includes integral radially extending projections 29 that are spaced circumferentially beneath the flange 23 and have their free ends engaging the inner surface 30 of the peripheral flange 15 of the cover. Each of the radially extending projections 29 includes a recess 31 on the underside thereof for receiving a metal washer 32. After assembly of the sub-assembly S, it is inserted within the cover and circumferentially spaced portions 33 of flange 15 on cap 13 are deformed inwardly to form dimples retaining the washer 32 in position. The washer 32 functions to maintain the body 20 and, in turn, the entire sub-assembly S in position even though there may be relative movement between the sub-assembly S and the cover 13.

As further shown in FIGS. 3 and 6, the body 20 includes axial upwardly extending integral fingers 34 spaced radially inwardly from flange 23. The upper free end of each finger 34 has a radial portion 35 with tapered surfaces 36, 37. The upper ends of the fingers 34 engage the flat inner surface of the base 14 of the cover 13, and the radial projections 35 are adapted to retain a spring retainer 38. Spring retainer 38 includes a flat portion 39 engaging the inner surface of the base 14 of the cover 13 and a peripheral lip 40 connected by an inclined intermediate portion 41 with the base 39. The lip 40 is adapted to engage beneath the surface 37 of the fingers 34 to retain a spring 45 which yieldingly urges a valve retainer 43 and, in turn, a valve 42 against the upper surface of a radial wall 44 integral with and extending radially inwardly from the body 20. This thereby defines the pressure relief valve 26.

The vacuum relief valve is defined by an integral cup portion 45a extending downwardly from the inner edge of wall 44 and having an inwardly extending bead 46 against which a spring 47 acts at one end and urges a valve 48 upwardly into engagement with the valve 42.

The torque limiting means is provided by teeth 51 which are provided on the periphery of the flange 23 and include inclined ramp surfaces 52 and generally radial surfaces 53 defining notches. The teeth 51 are yieldable radially by providing elongated slots 54 adjacent and aligned with the teeth 51 so that the teeth 51 are supported by beam portions 55 of flange 23, each beam portion being joined to the flange 23 at its ends and being yieldable intermediate its ends. Axially extending ribs or projections 50 deformed inwardly on flange 15 of cover 13 are adapted to engage the teeth 51, as presently described.

In order to assemble the filler cap, the sub-assembly S is first assembled. The parts 47, 48, 42, 43, 45 and 38 are loosely stacked in place upon each other, the spring retainer 38 fitting beneath the radial portions of fingers 34.

The tapered surfaces 36 provide for a lead in when retainer 38 is pressed into place. The periphery of retainer 38 deforms the fingers 34 outwardly until the retainer 38 passes beneath radial portions 35 and then the fingers 34 return to their normal diameter, which holds retainer 38 in a position to contain the parts beneath it. The O-ring 24 is then placed in position. All of the previously mentioned parts can now be handled as a single sub-assembly for subsequent handling as may be required during the assembly operation.

The handle 16 is resistance welded, or otherwise attached to cover 13. The cover 13 may have stamped warnings or other instructions imprinted on its exposed face in which case the handle 16 is radially oriented with respect to cover 13 in such a manner that the warnings or instructions are not obscured. The cover 13 is then assembled on sub-assembly S. Prior to assembly of sub-assembly S in cover 13, the upper surface of portion 39 projects above the upper ends of fingers 34.

After assembly, the fingers 34 engage the inner surface of the base 14 of cover 13, so that the retainer 38 is pressed inwardly. This produces a predetermined spring force on valve 42. Washer 32 is assembled after which the cover 13 is staked or deformed at 33 in a number of places so as to retain the aforementioned components in a single unit, yet allowing the cover 13 to be manually rotated with respect to body 20.

As the filler cap is screwed into the filler neck 11, the torus shaped lip at the filler neck opening contacts seal 24 allowing some compression of seal 24 and providing for a liquid tight seal between the filler cap and filler neck. Once this seal is affected, all vapor leaving or entering the fuel tank must pass through the filler cap through the vent paths shown in FIGS. 4 and 5.

When a predetermined torque is reached, the continued rotation of cover 13 brings axial ribs 56 on cap 13 in contact with the ramps 52. Further rotation of cover 13 provides force to be applied inwardly on ramps 52 by deforming the plastic portions 55 resulting in a "torque build up" or a resistance to rotation of cover 13. As rotation of cover 13 continues, the torque increases until ribs 50 rotate beyond ramps 52 to notches 53 at which time the plastic portions 55 return to their normal position and the torque returns to zero. The filler cap can then be further rotated, repeating the above action. This repeated action provides for a definite limitation to the tightness of the filler cap in the filler neck.

The desired amount of torque can be controlled by the size and shape of the teeth 51, ramps 52, notches 53 and ribs 50 as well as the material selected for use in body 20. The rate of torque build up can be controlled by either increasing or decreasing the angle of the ramps 52. Openings 54 have a secondary purpose in that they become a part of vapor vent path shown in FIGS. 3, 4 and 5.

During removal of the filler cap the cover 13 rotates counterclockwise in relation to body 20. When the ribs 50 abut notches 53, rotation between cover 13 and body 20 is stopped. Notches 53 are constructed so that the force applied by ribs 50 to notches 53 will be radial in direction and will not allow for deformation of the plastic portions 55 between ramps 52 and openings 54. Further rotation of the cover 13 will transmit the torque to body 20 until a sufficient valve of torque is reached to unscrew the filler cap from the filler neck.

The function and operation of the pressure and vacuum relief valves 26 and 27 is the same as described in U.S. Pat. No. 3,724,707, which is incorporated herein by reference.

When the cap is in place on the filler neck, air tight seals are effected assuring that no air will flow through the cap from the fuel tank to the atmosphere or vice versa except through the valve and only at those pressure differentials exceeding the limits for which the cap was designed.

When a positive pressure differential builds up to a predetermined value in the tank, valve 42 will move upward against the action of the spring 45. The valve will remain in this position until the pressure differential reduces to the point where the force in spring 45 returns the valve 42 to the sealed condition.

When a negative pressure differential builds up in the tank, valve 48 will move downward against the action of spring 47. The valve 48 will remain in this position until the pressure differential is reduced to the point where the force in spring 47 can return the valve 48 to its sealed position.

I claim:

1. A pressure-vacuum relief fuel filler cap comprising a cover, said cover comprising a base and a peripheral flange, a body of synthetic plastic material mounted at least partially within said cover with said peripheral flange surrounding a portion of said body, said body including an outer threaded end adapted to engage a threaded filler opening, said body having the other end thereof opposite said threaded end thereof engaging the base of said cover, a pressure relief valve and associated valve seat within said body, a vacuum relief valve and associated valve seat within said body, and torque limiting means between said body and said cover for limiting the torque applied to said cover during application to a filler opening, said torque limiting means comprising a plurality of circumferentially spaced radially inwardly extending portions on the inner surface of said peripheral flange of said cover, and a plurality of integral radially yieldable teeth on the periphery of said body adjacent said portions on said cover, said teeth including a ramp surface and a notch surface such that when the cover is rotated in one direction in applying the cap to a filler opening and a predetermined torque is reached, the cover can be rotated relative to said body with said radially inwardly extending portions moving along said ramp surfaces to succeeding notches, and when the cap is rotated in the opposite direction, said radially inwardly extending portions on the cover are engaged with the notches so that there can be no relative movement between the cover and the body, said body including radially extending circumferentially spaced integral projections extending outwardly into contact with the inner surface of the peripheral flange of the cover.

2. The combination set forth in claim 1 including a washer positioned on the underside of said projections, said cover having portions thereof extending radially inwardly from the inner surface of said cover and under said washer for axially locating said body within said cover.

3. The combination set forth in claim 2 wherein said radially inwardly extending portions on the inner surface of said cover comprise deformed portions of said peripheral flange.

4. The combination set forth in claim 2 wherein said radial projections on said body include recesses for receiving said annular washer.

5. A pressure-vacuum relief fuel filler cap comprising a cover, said cover comprising a base and a peripheral flange, a body of synthetic plastic material mounted at least partially within said cover with said peripheral flange surrounding a portion of said body, said body including an outer threaded end adapted to engage a threaded filler opening, said body having the other end opposite said threaded end thereof engaging the base of said cover, a pressure relief valve and associated valve seat within said body, a vacuum relief valve and associated valve seat within said body, and torque limiting means between said body and said cover for limiting the torque applied to said cover during application to a filler opening, said torque limiting means comprising a plurality of circumferentially spaced radially inwardly extending portions on the inner surface of said peripheral flange of said cover, and a plurality of integral radially yieldable teeth on the periphery of said body adjacent said radially inwardly extending portions on said cover, said teeth including a ramp surface and a notch surface such that when the cover is rotated in one direction in applying the cap to a filler opening and a predetermined torque is reached, the cover can be rotated relative to said body with said radially inwardly extending portions moving along said ramp surfaces to succeeding notches, and when the cap is rotated in the opposite direction, said radially inwardly extending portions on the cover are engaged with the notches so that there can be no relative movement between the cover and the body, said other end of said body engaging the base of said cover comprising axially extending circumferentially spaced integral fingers spaced radially inwardly from the periphery of said body.

6. The combination set forth in claim 5 wherein said fingers are radially yieldable.

7. The combination set forth in claim 6 wherein said pressure relief valve comprises a radially extending wall extending inwardly from said body intermediate its ends, said wall defining a valve seat, a valve, and spring means interposed between said cover and said valve urging said valve against said valve seat.

8. The combination set forth in claim 7 including a spring retainer interposed between the base of said cover and said spring, said spring retainer having portions thereof engaging portions of said fingers.

9. The combination set forth in claim 8 wherein said fingers include radially inwardly extending portions engaging the spring retainer.

10. The combination set forth in claim 4 wherein said spring retainer includes a peripheral lip engaging said radially inwardly extending portions of said fingers.

11. The combination set forth in claim 10 wherein said spring retainer includes a flat portion engaging the base of said cover.

12. The combination set forth in claim 11 wherein said flat portion extends axially beyond the ends of said fingers before said body is provided in said cover such that the action of said spring is controlled when the body is assembled in said cover.

13. The combination set forth in claim 12 including a tapered surface intermediate the flat portion of said spring retainer and said peripheral lip.

14. The combination set forth in claim 8 wherein said vacuum relief valve comprises a valve adapted to engage the valve of said pressure relief valve, and spring means interposed between portions of said inwardly extending wall of said body and said last-mentioned valve.

15. The combination set forth in claim 14 wherein said inwardly extending wall of said body includes a cup-shaped portion the lower end of which extends radially inwardly to engage said spring of said vacuum relief valve.

16. A fuel filler cap comprising
a cover,
said cover comprising a base and a peripheral flange,
a body of synthetic plastic material mounted at least partially within said cover with said peripheral flange surrounding a portion of said body,
said body including an outer threaded end adapted to engage a threaded filler opening,
said body having the other end thereof opposite said threaded end engaging the base of said cover,
and torque limiting means between said body and said cover for limiting the torque applied to said cover during application to a filler opening,
said torque limiting means comprising a plurality of circumferentially spaced radially inwardly extending portions on the inner surface of said peripheral flange of said cover,
and a plurality of integral radially yieldable teeth on the periphery of said body,
said teeth including a ramp surface and a notch surface such that when the cover is rotated in one direction in applying the cap to a filler opening and a predetermined torque is reached, the cover can be rotated relative to said body with said radially inwardly extending portions moving along said ramp surfaces to succeeding notches, and when the cap is rotated in the opposite direction, said radially inwardly extending portions on the cover are engaged with the notches so that there can be no relative movement between the cover and the body,
said body including radially extending circumferentially spaced integral projections extending outwardly into contact with the inner surface of the peripheral flange of the cover.

17. The combination set forth in claim 16 including a washer positioned on the underside of said projections, said cover having portions thereof extending radially inwardly from the inner surface of said cover and under said washer for axially locating said body within said cover.

18. The combination set forth in claim 17 wherein said radially inwardly extending portions on the inner surface of said cover comprise deformed portions of said peripheral flange.

19. The combination set forth in claim 17 wherein said radial projections on said body include recesses for receiving said annular washer.

20. For use in a pressure-vacuum relief fuel filler cap a sub-assembly comprising
a body of synthetic plastic material adapted to be mounted at least partially within a cover with a peripheral flange of the cover surrounding a portion of said body,
said body including an outer threaded end adapted to engage a threaded filler opening,
said body having the other end thereof opposite said threaded end engaging the base of said cover,
and torque limiting means on said body adapted to coact with a cover for limiting the torque applied to said cover during application to a filler opening,
said torque limiting means comprising a plurality of integral radially yieldable portions on the periphery of said body,
said teeth including a ramp surface and a notch surface such that when a cover is rotated in one direction in applying the cap to a filler opening, and a predetermined torque is reached, the cover can be rotated relative to said body and when the cap is rotated in the opposite direction, that there can be no relative movement between the cover and the body,
said body including radially extending circumferentially spaced integral projections extending outwardly and adapted to contact the inner surface of the peripheral flange of a cover.

21. The combination set forth in claim 20 including a washer positioned on the underside of said projections.

22. The combination set forth in claim 21 wherein said radial projections on said body include recesses for receiving said annular washer.

23. The combination set forth in claim 20 wherein said other end of said body adapted to engage the base of said cover comprises axially extending circumferentially spaced integral fingers.

24. The combination set forth in claim 23 wherein said fingers are radially yieldable.

25. The combination set forth in claim 24 including a pressure relief valve on said body comprising a radially extending wall extending inwardly from said body intermediate its ends,
said wall defining a valve seat,
a valve,
a spring retainer interposed between the base of said cover and said spring,
said spring retainer having portions thereof engaging portions of said fingers,
and spring means interposed between said spring retainer and said valve urging said valve against said valve seat.

26. The combination set forth in claim 25 wherein said fingers include radially inwardly extending portions engaging the spring retainer.

27. The combination set forth in claim 26 wherein said spring retainer includes a peripheral lip engaging said radially inwardly extending portions of said fingers.

28. The combination set forth in claim 27 wherein said spring retainer includes a centrally located flat portion adapted to engage the base of a cover.

29. The combination set forth in claim 28 wherein said flat portion extends axially beyond the ends of said fingers before said body is provided in a cover such that the action of said spring is controlled when the body is assembled in said cover.

30. The combination set forth in claim 29 including a tapered surface intermediate the flat portion of said spring retainer and said peripheral lip.

31. The combination set forth in claim 25 including a vacuum relief valve provided on said body comprising a valve adapted to engage the valve of said pressure relief valve,
and spring means interposed between portions of said inwardly extending wall of said body and said last-mentioned valve.

32. The combination set forth in claim 31 wherein said inwardly extending wall of said body includes a cup-shaped portion the lower end of which extends radially inwardly to engage said spring of said vacuum relief valve.

33. In a fuel filler cap comprising
a cover,
said cover comprising a base and a peripheral flange,
a body of synthetic plastic material mounted at least partially within said cover with said peripheral flange surrounding a portion of said body,
said body including an outer threaded end adapted to engage a threaded filler opening,
said body having a radially extending flange on the other end thereof,
said body including radially extending circumferentially spaced integral projections extending outwardly into contact with the inner surface of the peripheral flange of the cover,
a washer provided on the underside of said projections,
said cover having portions thereof extending radially inwardly for axially locating said body within said cover,
and torque limiting means between said body and said cover for limiting the torque applied to said cover during application to a filler opening,
said torque limiting means comprising a plurality of circumferentially spaced radially inwardly extending portions on the inner surface of said peripheral flange of said cover,
and a plurality of integral radially yieldable teeth on the periphery of said flange of said body adjacent said radially inwardly extending portions on said cover,
said flange having circumferentially elongated openings extending axially therethrough, the portion of said flange between each said opening and the periphery of said flange and defining a beam portion having ends which are joined to said flange, each said beam portion being yieldable intermediate its ends, said teeth being on said beam portions,
said teeth including a ramp surface and a notch surface such that when the cover is rotated in one direction in applying the cap to a filler opening and a predetermined torque is reached, the cover can be rotated relative to said body with said radially inwardly extending portions moving along said ramp surfaces to succeeding notches, and when the cap is rotated in the opposite direction, the radially inwardly extending portions on the cover are engaged with the notches so that there can be no relative movement between the cover and the body.

34. The combination set forth in claim 33 wherein said radial projections on said body include recesses for receiving said annular washer.

35. The combination set forth in claim 33 wherein said body includes axially extending circumferentially spaced integral fingers adapted to engage the base of the cover.

36. The combination set forth in claim 35 wherein said fingers are radially yieldable.

37. The combination set forth in claim 36 including a pressure relief valve on said body comprising a radially extending wall extending inwardly from said body intermediate its ends,
said wall defining a valve seat,
a valve,
a spring retainer interposed between the base of said cover and said springs,
said spring retainer having portions thereof engaging portions of said fingers,
and spring means interposed between said spring retainer and said valve urging said valve against said valve seat.

38. The combination set forth in claim 37 wherein said fingers include radially inwardly extending portions engaging the spring retainer, said spring retainer including a peripheral lip engaging said radially inwardly extending portions of said fingers.

39. The combination set forth in claim 38 wherein said spring retainer includes a flat portion engaging the base of said cover.

40. The combination set forth in claim 39 wherein said flat portion extends axially beyond the ends of said fingers before said body is provided in said cover such that the action of said spring is controlled when the body is assembled in said cover.

41. The combination set forth in claim 40 including a tapered surface intermediate the flat portion of said spring retainer and said peripheral lip.

42. The combination set forth in claim 40 including a vacuum relief valve on said body comprising a valve adapted to engage the valve of said pressure relief valve,
and spring means interposed between portions of said inwardly extending wall of said body and said last-mentioned valve,
said inwardly extending wall of said body includes a cup-shaped portion the lower end of which extends radially inwardly to engage said spring of said vacuum relief valve.

43. A pressure-vacuum relief fuel filler cap comprising
a cover,
said cover comprising a base and a peripheral flange,
a body of synthetic plastic material mounted at least partially within said cover with said peripheral flange surrounding a portion of said body,
said body including an outer threaded end adapted to engage a threaded filler opening,
said body having the other end thereof opposite said threaded end thereof engaging the base of said cover,
a pressure relief valve and associated valve seat within said body,
a vacuum relief valve and associated valve seat within said body,
and torque limiting means between said body and said cover for limiting the torque applied to said cover during application to a filler opening,
said torque limiting means comprising a plurality of circumferentially spaced radially inwardly extending portions on the inner surface of said peripheral flange of said cover,
and a plurality of integral radially yieldable teeth on the periphery of said radially extending flange of said body,
said teeth including a ramp surface and a notch surface such that when the cover is rotated in one direction in applying the cap to a filler opening and a predetermined torque is reached, the cover can be rotated relative to said body with said radially inwardly extending portions moving along said ramp surfaces to succeeding notches, and when the cap is rotated in the opposite direction, said radially inwardly extending portions on the cover are engaged with the notches so that there can be no relative movement between the cover and the body,
said body including radially extending circumferentially spaced integral projections extending outwardly into contact with the inner surface of the peripheral flange of the cover.

* * * * *